(12) United States Patent
Walker et al.

(10) Patent No.: US 10,789,240 B2
(45) Date of Patent: Sep. 29, 2020

(54) DUPLICATIVE DATA DETECTION

(71) Applicant: Google LLC, Mountain View, CA (US)

(72) Inventors: Jacob Walker, Los Gatos, CA (US);
Laura Eidem, Mountain, CA (US)

(73) Assignee: Google LLC, Mountain View, CA (US)

( * ) Notice: Subject to any disclaimer, the term of this patent is extended or adjusted under 35 U.S.C. 154(b) by 298 days.

(21) Appl. No.: 15/805,047

(22) Filed: Nov. 6, 2017

(65) Prior Publication Data

US 2019/0138628 A1  May 9, 2019

(51) Int. Cl.
| | | |
|---|---|---|
| *G06F 17/30* | (2006.01) | |
| *G06F 16/23* | (2019.01) | |
| *G06F 16/215* | (2019.01) | |
| *G06F 16/25* | (2019.01) | |
| *G06F 40/295* | (2020.01) | |

(52) U.S. Cl.
CPC ........ *G06F 16/2365* (2019.01); *G06F 16/215* (2019.01); *G06F 16/2379* (2019.01); *G06F 16/254* (2019.01); *G06F 40/295* (2020.01)

(58) Field of Classification Search
CPC ............. G06F 16/24578; G06F 16/248; G06F 16/958; G06F 16/90335; G06F 16/35; G06F 16/2462
See application file for complete search history.

(56) References Cited

U.S. PATENT DOCUMENTS

| | | | |
|---|---|---|---|
| 8,549,019 B2 * | 10/2013 | Nandy ................. | G06F 16/958 707/754 |
| 8,751,544 B2 * | 6/2014 | Mui ...................... | G06F 16/248 707/805 |
| 2010/0312884 A1 * | 12/2010 | Nandy ............... | G06F 16/24556 709/224 |
| 2010/0318527 A1 * | 12/2010 | Nandy .................. | G06F 3/0484 707/754 |

(Continued)

OTHER PUBLICATIONS

PCT, "International Search Report and Written Opinion for International Application No. PCT/US2018/048376", dated Dec. 17, 2018, 14 pages.

(Continued)

*Primary Examiner* — Daniel A Kuddus
(74) *Attorney, Agent, or Firm* — Lerner, David, Littenberg, Krumholz & Mentlik, LLP

(57) ABSTRACT

In some implementations, a computer-implemented method includes analyzing first data from a first data source to determine a first schema of the first data source, and analyzing second data from a second data source to determine a second schema of the second data source. The method can further include generating a first two-dimensional aggregation of a first time data series having a time dimension and a dimension corresponding to aggregated values of a first metric, and generating a second two-dimensional aggregation of a second time data series having a time dimension and a dimension corresponding to aggregated values of a second metric. The method can also include computing a (Continued)

correlation value between the first two-dimensional aggregation and the second two-dimensional aggregation, and providing an indication of duplicated data between the first data source and the second data source if the correlation value meets a threshold.

20 Claims, 11 Drawing Sheets

(56) References Cited

U.S. PATENT DOCUMENTS

| | | | | |
|---|---|---|---|---|
| 2011/0055214 | A1* | 3/2011 | Mui | G06F 16/248 |
| | | | | 707/737 |
| 2011/0119374 | A1* | 5/2011 | Ruhl | H04L 43/04 |
| | | | | 709/224 |
| 2011/0119674 | A1* | 5/2011 | Nishikawa | G06F 9/5066 |
| | | | | 718/103 |
| 2016/0042013 | A1* | 2/2016 | Fan | G06F 16/283 |
| | | | | 707/792 |

OTHER PUBLICATIONS

Ulf Leser, et al., "(Almost) Hands-Off Information Integration for the Life Sciences", Humboldt University of Berlin, Germany, Retrieved from the Internet: URL:http://edoc.hu-berlin.de/oa/conferences/reBvh1FSQxl/PDF/272oan35QrbFY.pdf, Jan. 31, 2005, pp. 505-510.

Mohammed Gollapalli et al: "Approximate Record Matching Using Hash Grams", Data Mining Workshops (ICDMW), 2011 IEEE 11th International Conference on, IEEE, Dec. 11, 2011 (Dec. 11, 2011), pp. 504-511, XP032100109, DOI: 10.1109/ICDMW, 2011.33 ISBN: 978-1-4673-0005-6 pp. 2-5.

International Preliminary Report on Patentability for International Application No. PCT/US2018/048376 dated May 22, 2020. 12 pp.

\* cited by examiner

DUPLICATIVE DATA DETECTION

BACKGROUND

Many entities store large amounts of data in cloud computing systems and in local data storage systems. Some of the stored data may be redundant due to being captured and stored by more than one system that uploaded the same or similar data for storage. As operating units, product areas or divisions within large entities, such as companies, private organizations, or government agencies, become more distributed and dispersed, it may become difficult to provide manual, top-down oversight of duplicative data storage. Such oversight may require familiarity with numerous internal data storage systems. In practice, divisions within an entity may independently store data related to their respective divisions, which may trigger inefficiencies of employee activity (e.g., data pipeline maintenance and upload time) and computational inefficiencies (e.g., wasted data storage, increased storage time, and increased storage cost).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method. The method can include programmatically analyzing first data from a first data source to determine a first schema of the first data source, the first schema including one or more dimensions (where a dimension is a categorical element of a data source) of the first data from the first data source, and programmatically analyzing second data from a second data source to determine a second schema of the second data source, the second schema including one or more dimensions of the second data from the second data source. The method can also include sampling a first metric (where a metric is a numerical element or a quantity in a data source that is being summarized for comparison of data sources) based on a first time dimension of the first data source to obtain a plurality of values for the first metric that form a first time data series, and sampling a second metric based on a second time dimension of the second data source to generate a plurality of values for the second metric that form a second time data series.

The method can further include generating a first two-dimensional aggregation of the first time data series having a time dimension and a dimension corresponding to aggregated values of the first metric, and generating a second two-dimensional aggregation of the second time data series having a time dimension and a dimension corresponding to aggregated values of the second metric. The method can also include computing a correlation value between the first two-dimensional aggregation and the second two-dimensional aggregation. The method can further include providing an indication of duplicated data between the first data source and the second data source if the correlation value meets a threshold.

In some implementations, programmatically analyzing the first data source to determine the first schema of the first data source and programmatically analyzing the second data source to determine the second schema of the second data source can be performed using a named entity recognition technique. The method can also include identifying, using the named entity recognition technique, one or more of at least one dimension of the first schema of the first data source that is similar to at least one dimension of the second schema of the second data source, and at least one dimension of the first schema of the first data source and at least one dimension of the schema of the second data source that provide different levels of granularity of a common dimension.

In some implementations, computing the correlation value can include k-means clustering. The method can further include repeating the sampling and generating for the first data source and the second data source using respective other metrics different from the first metric and the second metric to generate respective additional pairs of two-dimensional aggregations corresponding to the first data source and the second data source, respectively. The method can also include computing respective correlation values between each of the respective additional pairs of two-dimensional aggregations, and providing one or more additional indications of duplicated data between the first data source and the second data source, if one or more of the respective correlation values meet the threshold.

In some implementations, sampling the first metric based on the first time dimension of the first data source can include sampling each value of the first metric, and sampling the second metric based on the second time dimension of the second data source includes sampling each value of the second metric. In some implementations, providing the indication of duplicated data can include providing a recommendation of a level of granularity of data to store.

The method can also include identifying one or more entity to entity relationships based on the first schema and the second schema, and storing the one or more entity to entity relationships in a library of relationships. The method can further include using the library of relationships to perform a duplication check for a third data source.

In some implementations, providing the indication of duplicated data can include providing a user interface that includes a user interface element that, when selected, causes the duplicated data to be deleted from at least one of the first data source and the second data source. The method can further include upon selection of the user interface element, deleting the duplicated data from the at least one of the first data source and the second data source, wherein storage space utilized for storage of the first data and the second data is reduced after the deleting.

In some implementations, providing an indication of duplicated data between the first data source and the second data source can include automatically deleting the duplicated data, and providing a user interface that indicates that the duplicated data was deleted. In some implementations, the user interface can include an element that indicates an amount of the duplicated data. In some implementations, providing an indication of duplicated data between the first data source and the second data source comprises providing a confidence value for the duplicated data.

Some implementations can include a computer-implemented method that can include programmatically analyzing first data from a first data source to determine a first schema of the first data source, the first schema including one or more dimensions of the first data from the first data source, and programmatically analyzing second data from a second data source to determine a second schema of the second data source, the second schema including one or more dimensions of the second data from the second data source. The method can also include obtaining first sample data from the first data source wherein the first sample data includes a plurality of values for a first metric and a respective first time value having a first time dimension, and obtaining second sample data from the second data source wherein the second sample data includes a plurality of values for a first metric and a respective second time value having a second time dimension, wherein the second time dimension is less granular than the first time dimension.

The method can further include aggregating the first sample data to generate aggregated plurality of values for the first metric, wherein the aggregation includes grouping respective subsets of the plurality of values that are within a particular time interval. The method can also include computing a correlation value between the aggregated first sample data and the second sample data, and providing an indication of duplicated data between the first data source and the second data source, if the correlation value meets a threshold.

In some implementations, the particular time interval can correspond to granularity of the second time dimension. In some implementations, the first time dimensions can be seconds, the second time dimension can be minutes, and the particular time interval can be one minute.

Some implementations can include a system that comprises one or more processors coupled to a non-transitory computer readable medium having stored thereon software instructions that, when executed by the one or more processors, cause the one or more processors to perform operations. The operations can include programmatically analyzing first data from a first data source to determine a first schema of the first data source, the first schema including one or more dimensions of the first data from the first data source.

The operations can also include sampling a first metric based on a first time dimension of the first data source to obtain a plurality of values for the first metric that form a first time data series, and sampling a second metric based on a second time dimension of a second data source to generate a plurality of values for the second metric that form a second time data series, wherein the second data source has a second schema that includes one or more dimensions. The operations can further include generating a first two-dimensional aggregation of the first time data series having a time dimension and a dimension corresponding to aggregated values of the first metric, and generating a second two-dimensional aggregation of the second time data series having a time dimension and a dimension corresponding to aggregated values of the second metric.

The operations can also include computing a correlation value between the first two-dimensional aggregation and the second two-dimensional aggregation, and providing an indication of duplicated data between the first data source and the second data source, if the correlation value meets a threshold. In some implementations, programmatically analyzing the first data source to determine the first schema of the first data source and programmatically analyzing the second data source to determine the second schema of the second data source are performed using a named entity recognition technique. The operations can also include repeating the sampling and generating for the first data source and the second data source using respective other metrics different from the first metric and the second metric to generate respective additional pairs of two-dimensional aggregations corresponding to the first data source and the second data source, respectively. The operations can further include computing respective correlation values between each of the respective additional pairs of two-dimensional aggregations, and, if one or more of the respective correlation values meet the threshold, providing one or more additional indications of duplicated data between the first data source and the second data source.

In some implementations, providing the indication of duplicated data includes providing a user interface that includes a user interface element that, when selected, causes the duplicated data to be deleted from at least one of the first data source and the second data source, and wherein the operations further include, upon selection of the user interface element, deleting the duplicated data from the at least one of the first data source and the second data source, wherein storage space utilized for storage of the first data and the second data is reduced after the deleting.

DETAILED DESCRIPTION

Figure 1:
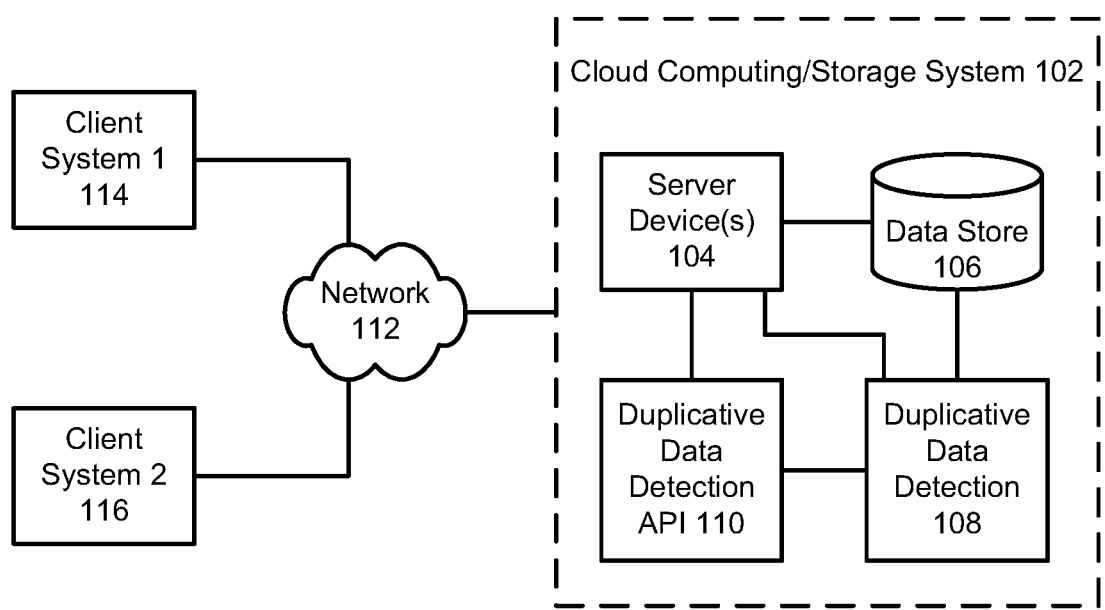
FIG. 1 is a diagram of an example cloud computing/storage environment with duplicative data detection in accordance with some implementations.

Implementations of the subject matter in this application relate to detection of duplicative data, which can include data that is the same or similar and/or data stores having duplicative intents.

Two or more different data sources or files (e.g., log files) may comprise duplicative data, i.e. data that is present in each one of the two or more files. In some cases, the presence of duplicative data may cause an increased processing effort. Thus, the corresponding processing system will process (and possibly store) some data several times although one-time processing would be enough, which leads to a decreased efficiency of the processing system and waste of computing resources such as data storage capacity. A data source can include streaming data (e.g., data sent by an IoT sensor over a network), one or more files (e.g., log recordings by a sensor or other system), and databases (e.g., an organized data collection with a known schema).

In other cases, duplicative data may comprise similar data, i.e. data with a certain degree (e.g., predetermined percentage) of similarity. Since the data is not exactly the same, searching for exact duplicates, as done usually, may not be sufficient. Further, similar data in one file may be used to remedy deficiencies (e.g., insufficient data) in another file.

Therefore, a need for a methodology for a more reliable detection of duplicative data in data files still exists such that an improved operating of processing systems using the respective data files may be provided.

Some implementations can include method for automated detection of duplicative data in two or more different files (e.g. log files). For example, the method can include using machine learning techniques to identify duplicate (e.g., the same data logged by multiple systems within a large enterprise) or similar stored data, or duplicate or similar data logging intentions (e.g., data that has been logged in two different places and in two different ways that contains duplicative information) and learn relationships between entities within data logs. Some implementations provide an advantage of detecting duplicative data that may otherwise go undetected. For example, by detecting duplicative logging intentions (e.g., logging given data by state and by country made up of states), an implementation can identify duplicate data that is not exactly the same data and could possibly be missed by systems merely checking for exact duplicate records. A user can be prompted to discard duplicate data.

In some implementations, the method can include programmatically analyzing a first data source to determine a first schema of the first data source including one or more dimensions of data in the first data source, and programmatically analyzing a second data source to determine a second schema of the second data source including one or more dimensions of data in the second data source. The method can also include sampling a first metric along a first time dimension of the first data source to generate a plurality of values for the first metric that form a first time data series, and sampling a second metric along a second time dimension of the second data source to generate a plurality of values for the second metric that form a second time data series.

The method can further include generating a first two-dimensional aggregation of the first time data series having a time dimension and a dimension corresponding to aggregated values of the first metric, and generating a second two-dimensional aggregation of the second time data series having a time dimension and a dimension corresponding to aggregated values of the second metric. The method can also include computing a correlation value between the first two-dimensional aggregation and the second two-dimensional aggregation. The method can further include providing an indication of duplicated data between the first data source and the second data source when the correlation value meets a threshold. In some implementations, computing the correlation value can include k-means clustering.

In some implementations, programmatically analyzing the first data source to determine the schema of the first data source and programmatically analyzing the second data source to determine the second schema of the second data source are performed using a Named Entity Recognition (NER) technique. The method can also include identifying, using the NER technique, one or more of: at least one dimension of the first schema of the first data source that is similar to at least one dimension of the second schema of the second data source, and at least one dimension of the schema of the first data source and at least one dimension of the schema of the second data source that provide different levels of granularity of a common dimension. Similarity of data source dimensions can include dimensions that are the same (e.g., both dimensions are "distance in kilometers" or "distance in metric units" or "temperature" (which can easily be converted from F to C and vice versa), etc.

The method can also include repeating the sampling and generating for the first data source and the second data source using respective other metrics different from the first metric and the second metric to generate another pair of two-dimensional aggregations corresponding to the first data source and the second data source, respectively. The method can further include computing another correlation value between the other pair of two-dimensional aggregations, and, when the other correlation value meets the threshold, providing another indication of duplicated data between the first data source and the second data source.

Sampling the first metric along the first time dimension of the first data source can include sampling each value of the first metric. Sampling the second metric along the second time dimension of the second data source can include sampling each value of the second metric. Providing the indication of duplicated data can include providing a recommendation of a level of granularity of data to store in a single data source. The sampling can be performed within a particular time period based on the first/second time dimension.

The method can also include learning one or more entity to entity relationships based on the first schema and the second schema, and identifying at least one dimension of the schema of the first log data source that is similar to at least one dimension of a schema of a second log data source. The method can further include storing learned relationships in a library of learned relationships, and using the library of learned relationships to perform a duplication check for a third data source. In some implementations, the indication of duplicated data can include a recommendation to delete the duplicated data and a user interface element that, when selected, causes the duplicated data to be deleted.

By the detection of duplicative data in two or more different files, as described herein, an accurate detection of duplicative data is enabled that besides the improved and reliable detection of exact duplicative data allows also a reliable detection of similar duplicative data. This improved duplicated data detection contributes to a more efficient operation of processing system(s) that have to handle or operate based on or by use of the two or more different files. The increased efficiency leads further to a resource saving operation of the respective processing systems. The efficiency is increased in view of at least one of: detection and deletion of duplicative data and, if the duplicative data refers to similar data, also in view of the possibility to supplement data of one file by similar data of another file, i.e. in view of the possibility to remedy insufficiencies of data in the one file.

In some implementations, a duplicative data detection system can be part of a cloud computing/storage system. FIG. 1 illustrates a diagram of an example environment 100, which may be used in some implementations described herein. In some implementations, environment 100 includes at least one cloud computing/storage system 102. The cloud computing/storage system 102 can communicate with a network 112, for example. The cloud computing/storage system 102 can include at least one server device 104, a data store 106 or other data storage system or device, a duplicative data detection system 108, and a duplicative data detection application program interface (API) 110. The duplicative data detection system 108 and API 110 can be integrated into one system (e.g., having its own processor or processors) and may be a standalone system (e.g., provided as part of the cloud computing/storage system 102) or may be integrated with the server device 104.

Environment 100 also can include one or more client devices, e.g., client devices 114 and 116, which may communicate with each other and/or with the cloud computing/storage system 102 via network 112. Network 112 can be any type of communication network, including one or more of the Internet, local area networks (LAN), wireless networks, switch or hub connections, etc. In some implementations, network 112 can include peer-to-peer communication between devices, e.g., using peer-to-peer wireless protocols (e.g., Bluetooth®, Wi-Fi Direct, etc.), etc.

For ease of illustration, FIG. 1 shows one block for cloud computing/storage system 102, server device 104, data store 106, and shows two blocks for client devices 114-116. Blocks 102, 104, 106, 108, 114, and 116 may represent multiple systems, server devices, and network data stores, and the blocks can be provided in different configurations than shown. In some implementations, the cloud computing/storage system 102 and client devices 114-116 may be controlled and/or operated by different owners or parties.

For example, cloud computing/storage system 102 can represent multiple server systems that can communicate with other server systems via the network 112. In some implementations, the server device 104 can include cloud hosting servers, and the data store 106 can include a cloud storage system, for example. In some examples, the data store 106 and/or other data storage devices can be provided in systems that are integrated with or separate from the server device 104, and can communicate with the server device 104, and other server systems via network 112.

Also, there may be any number of client devices. Each client device can be any type of electronic device, e.g., desktop computer, laptop computer, portable or mobile device, cell phone, smart phone, tablet computer, television, TV set top box or entertainment device, cameras, home speaker, videoconferencing systems, wearable devices (e.g., display glasses or goggles, wristwatch, headset, armband, jewelry, etc.), personal digital assistant (PDA), media player, game device, Internet-Of-Things (IoT) devices (e.g., smart locks, thermostats, home speakers, air quality sensors, temperature sensors, pressure sensors, smoke detectors, security cameras, alarms, etc.), industrial or office equipment (e.g., industrial sensors; factory equipment; telecommunication equipment such as switches, routers, hubs; printers; copiers; scanners; etc.) etc. Some client devices may also have a local data store similar to data store 106 or other storage. In some implementations, environment 100 may not have all of the components shown and/or may have other elements including other types of elements instead of, or in addition to, those described herein.

Respective client devices 114-116 may communicate data to and from one or more cloud computing/storage systems, e.g., cloud computing/storage system 102. In some implementations, the cloud computing/storage system 102 may retrieve and provide retrieved stored data to the client devices 114-116.

In some implementations, any of cloud computing/storage system 102, and/or one or more client devices 120-126 can provide a duplicative data detection application or duplicative data detection program. The duplicative data detection program can provide one or more associated user interfaces that are displayed on a display device associated with the cloud computing/storage system or one or more of the client devices. The user interface may provide various information to a user regarding detection of duplicative data (if any) and also provide options to a user to select how to handle duplicative data, such as ignoring duplicative data, removing duplicative data, etc.

The duplicative data detection functions provided by the duplicative data detection system 108 can be invoked by request from the server device 104 to the duplicative data detection system 108 directly or via the API 110. The duplicative data detection functions can also be invoked by request or call from one or more of the client devices 114-116 via the API 110 or directly via the duplicative data detection system 108. For example, a program running on the server device 104 or on one of the client devices 114-116 can request duplicative data detection via the API 110. The API 110 provides an interface to the duplicative data detection system 108, which can receive and acknowledge the request, perform duplicative data detection (e.g., on a portion of data stored in data store 106 associated with one or more of the client devices 114-116), and return the results of duplicative data detection request to the requesting device or system. The duplicative data detection can include performing one or more operations or sequences of operations to detect duplicative data as described herein (e.g., one or more of 602-616, 702-714, and/or 802-812).

Duplicative data detection can also be performed automatically on a periodic basis (e.g., weekly, monthly, daily, etc.), or in response to an event such as the establishment of a new data storage area, newly added/modified quantity of data, change in available storage capacity/budget, addition of a new data source, etc.

Figure 2:
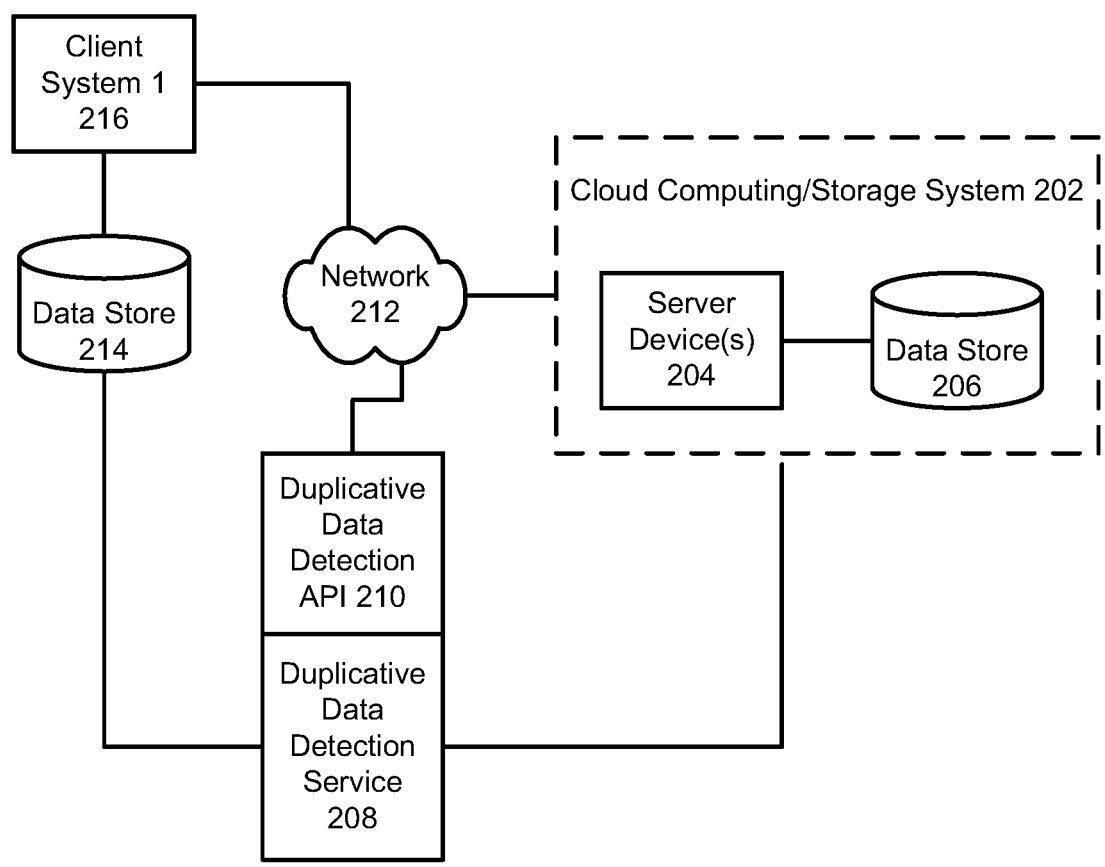
FIG. 2 is a diagram of an example duplicative data detection system in accordance with some implementations.

In some implementations, a duplicative data detection service can be a separate third party service provided by a system separate from a cloud computing/storage system and from a client system. FIG. 2 is a diagram of an example duplicative data detection environment 200 in accordance with some implementations. In particular, environment 200 includes a cloud computing/storage system 202 having one or more server devices 204 and a data store 206. The environment 200 also includes a standalone duplicative data detection service 208 (separate from the cloud computing/storage system 202, e.g., operated by a different entity) and corresponding API 210. The duplicative data detection service 208 and/or API 210 are coupled to a network 212. A client system 216 is coupled to a local data store 214 and to the network 212.

In operation, the client system 216 can request duplicative data detection services from the duplicative data detection service 208 (e.g., via a web services request, or via the API 210, etc.) to be performed on the local data store 214 or a cloud computing/storage data store (e.g., 206). The duplicative data detection can include performing one or more operations or sequences of operations to detect duplicative data as described herein (e.g., one or more of 602-616, 702-714, and/or 802-812). The duplicative data detection service 208 can be a service that is owned and/or operated by a third party that is independent of, and/or different than, the owner/operator of the client system 216 and/or the cloud computing/storage system 202.

If duplicative data is detected between a first data source and a second data source within the data store 206, the duplicative data detection service 208 can provide an indication of duplicated data between the first data source and the second data source if a correlation value (as discussed in connection with FIGS. 6 and 7) of duplicative data in the first data source and the second data source meets a threshold. The indication can be provided from the duplicative data detection service 208 (e.g., via API 210) to the client system 216 (or to the cloud computing/storage system 202 if the request for duplicative data detection originated from the cloud computing/storage system 202).

In some implementations, providing the indication of duplicated data can include providing a user interface (or information to be included in a user interface) that includes a user interface element that, when selected, causes the duplicated data to be deleted from at least one of the first data source and the second data source. The method can further include upon selection of the user interface element, deleting the duplicated data from the at least one of the first data source and the second data source, wherein storage space utilized for storage of the first data and the second data is reduced after the deleting.

In some implementations, providing an indication of duplicated data between the first data source and the second data source can include automatically deleting the duplicated data, and providing a user interface that indicates that the duplicated data was deleted. In addition to or as an alternative to deleting the duplicated data, other techniques can be used to handle duplicated data such as storing in compressed form, storing on cheaper data storage (e.g., magnetic disk vs. solid state drive), storing in offline storage (e.g., tape drives, backup systems, etc. where the data is not immediately available), etc. In some implementations, the user interface can include an element that indicates an amount of the duplicated data. For example, an indication of the amount of duplicated data can include a percentage of data that is duplicative, size of duplicate data in bytes, cost of storage for duplicate data and expected savings (e.g., save $x per month by removing duplicate data). In some implementations, providing an indication of duplicated data between the first data source and the second data source comprises providing a confidence value for the duplicated data.

Figure 3:
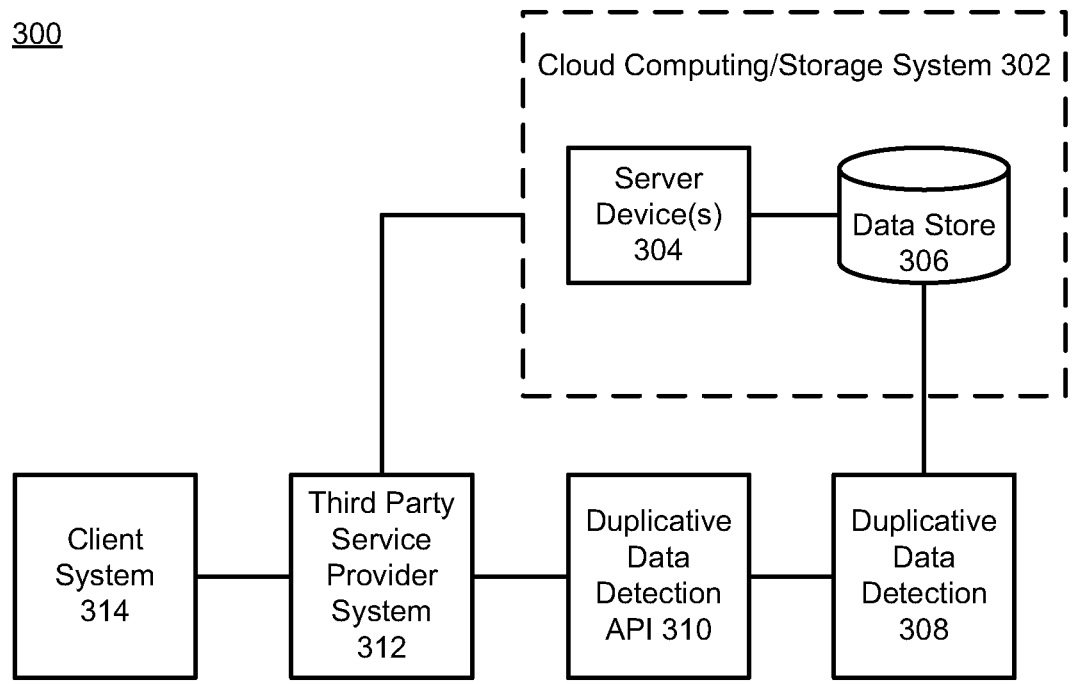
FIG. 3 is a diagram of an example duplicative data detection service provided through a third party cloud computing provider in accordance with some implementations.

In some implementations, a duplicative data detection system can operate in connection with a third party cloud computing/storage service provider. FIG. 3 is a diagram of an example duplicative data detection service environment 300 where the duplicative data detection service is provided through a third party cloud computing provider in accordance with some implementations. In particular, the environment 300 includes a cloud computing/storage system 302 having one or more server device(s) 304 and a data store 306. The environment 300 also includes a duplicative data detection system 308, a duplicative data detection API 310, a third party cloud service provider system 312, and a client system 314.

In operation, the third party cloud service provider system 312 may provide cloud computing and/or storage services to one or more clients (e.g., 314). The cloud computing/storage services provided by the third party cloud service provider system 312 may originate from the cloud computing/storage system 302, which may be owned/operated by a party different than the party than owns/operates the third party cloud service provider system 312 and/or the client system 314.

The third party cloud service provider system 312 can request duplicative data detection services on behalf of the client system 314 (e.g., via API 310). The duplicative data detection system 308 can perform duplicative data detection operations (e.g., one or more of 602-616, 702-714, and/or 802-812).

If duplicative data is detected between a first data source and a second data source within the data store 306, the cloud computing/storage system 302 can provide an indication of duplicated data between the first data source and the second data source if a correlation value (as discussed in connection with FIGS. 6 and 7) of duplicative data in the first data source and the second data source meets a threshold. The indication can be provided from the duplicative data detection system 308 (e.g., via API 310) to the third party cloud service provider system 312, which can provide the indication of duplicative data to the client system 314.

In some implementations, providing the indication of duplicated data can include providing a user interface (or information to be included in a user interface) that includes a user interface element that, when selected, causes the duplicated data to be deleted from at least one of the first data source and the second data source. The method can further include upon selection of the user interface element, deleting the duplicated data from the at least one of the first data source and the second data source, wherein storage space utilized for storage of the first data and the second data is reduced after the deleting.

In some implementations, providing an indication of duplicated data between the first data source and the second data source can include automatically deleting the duplicated data, and providing a user interface that indicates that the duplicated data was deleted. In some implementations, the user interface can include an element that indicates an amount of the duplicated data. In some implementations, providing an indication of duplicated data between the first data source and the second data source comprises providing a confidence value for the duplicated data.

The APIs (e.g., 110, 210, and/or 310) can be separate or integrated with respective duplicative data detection systems (e.g., 108, 208, and/or 308).

Figure 4:
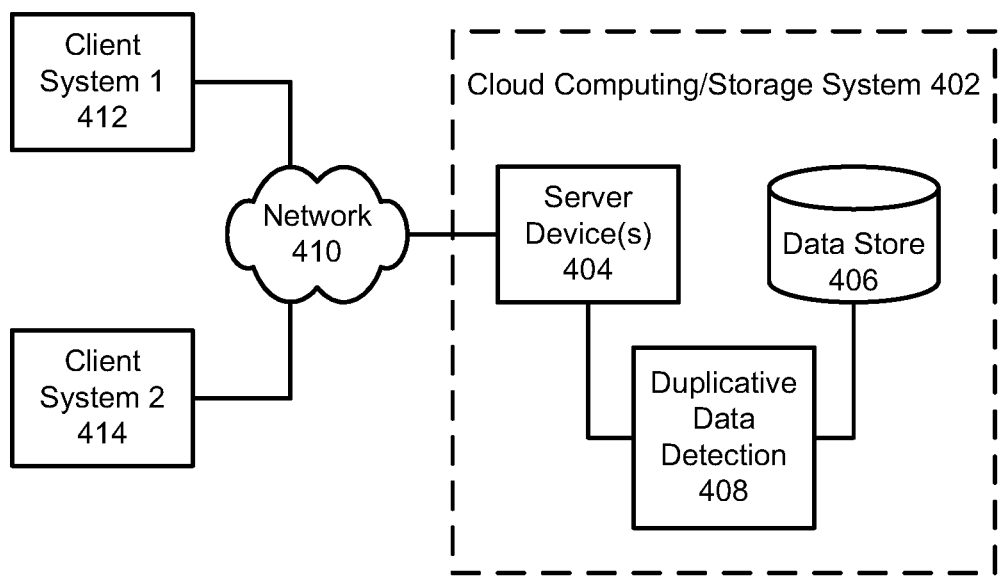
FIG. 4 is a diagram of an example cloud computing/storage system with an integrated duplicative data detection system in accordance with some implementations.

FIG. 4 is a diagram of an example environment 400 in which a cloud computing/storage system 402 includes an integrated duplicative data detection system 408. The example environment 400 includes two client systems 412, 414 coupled to a network 410. The cloud computing/storage system 402 includes at least one server device 404, a data store 406, and a duplicative data detection system 408.

In operation, as client (412 or 414) stores data into the data store 406, the server device 404 can request duplicative data detection from the duplicative data detection system 408. The request for duplicative data detection can be sent as new data storage sections are established in the data store 406, or periodically.

If duplicative data is detected between a first data source and a second data source within the data store 406, the cloud computing/storage system 402 can provide an indication of duplicated data between the first data source and the second data source if a correlation value (as discussed in connection with FIGS. 6 and 7) of duplicative data in the first data source and the second data source meets a threshold. In some implementations, data coming from the client system 412 and/or the client system 414 can have duplicative data detected and removed by the duplicative data detection system 408 prior to storing the data in data store 406.

In some implementations, providing the indication of duplicated data can include providing a user interface (or information to be included in a user interface) that includes a user interface element that, when selected, causes the duplicated data to be deleted from at least one of the first data source and the second data source. The method can further include upon selection of the user interface element, deleting the duplicated data from the at least one of the first data source and the second data source, wherein storage space utilized for storage of the first data and the second data is reduced after the deleting.

In some implementations, providing an indication of duplicated data between the first data source and the second data source can include automatically deleting (or otherwise handling) the duplicated data, and providing a user interface that indicates that the duplicated data was deleted. In some implementations, the user interface can include an element that indicates an amount of the duplicated data. In some implementations, providing an indication of duplicated data between the first data source and the second data source comprises providing a confidence value for the duplicated data.

Figure 5:
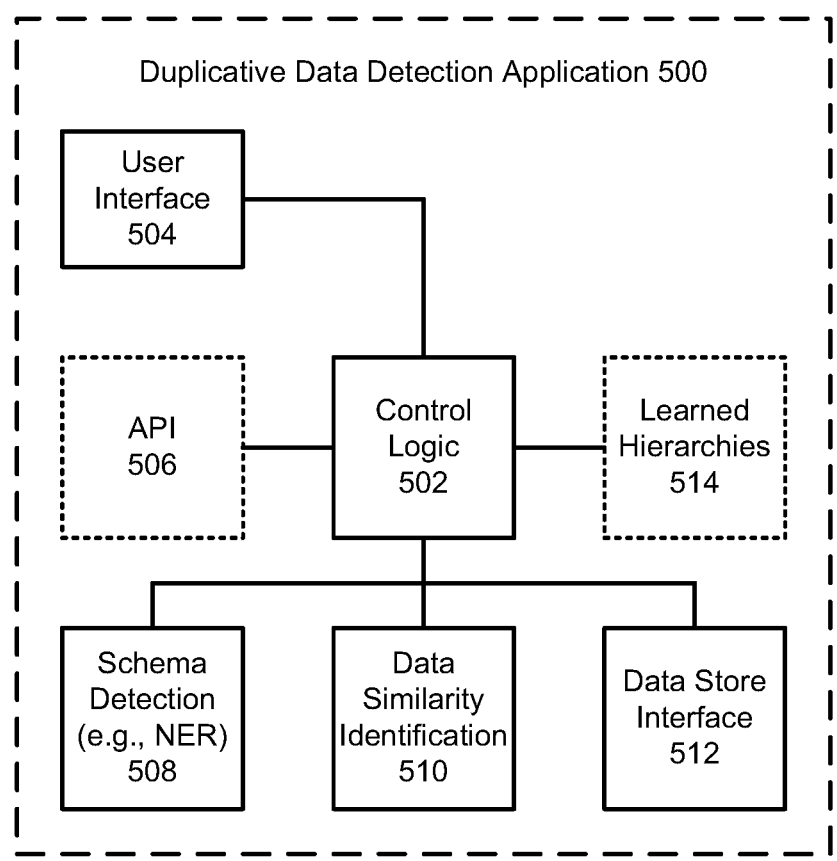
FIG. 5 is a diagram of an example duplicative data detection system in accordance with some implementations.

FIG. 5 is a diagram of an example duplicative data detection application 500 in accordance with some implementations. The duplicative data detection application 500 includes control logic 502, a user interface 504, an API 506, schema detection module 508, data similarity identification logic 510, data store interface 512, and learned hierarchies library 514.

The control logic can include logic encoded as software instructions and/or as hardware logic that when executed causes one or more processors to perform operations for duplicative data detection (e.g., one or more of methods 600, 700, and/or 800). The control logic can accomplish duplicative data detection tasks in conjunction with other elements of the duplicative data detection application 500. For example, the control logic can receive a request to detect duplicative data via the user interface 504 or the API 506.

In performing the duplicative data detection task, the control logic 502 can utilize the schema detection module 508 for programmatically analyzing first data from a first data source to determine a first schema of the first data source, where the first schema can include one or more dimensions of the first data from the first data source. The schema detection module could optionally be used to programmatically analyze second data from a second data source to determine a second schema of the second data source, where the second schema can include one or more dimensions of the second data from the second data source. One or more of the data sources may have a known schema and may not need the programmatic analysis to determine the schema. Programmatically analyzing can include using one or more processors to analyze data from one or more sources within a data store to determine a schema of the data, which can include using named entity recognition to determine the schema. Named entity recognition can be used to identify dimensions within a schema that may be similar or may provide different tiers, levels, or layers of granularity.

For example, data from a first data source may be sampled on a first time dimension (e.g., seconds) and data from a second data source may be sample on a second time dimension (e.g., minutes). The data from the first and second data sources may be grouped according to a dimension such as a particular time interval, which may correspond to the granularity of the second time dimension (e.g., where the particular interval is one minute) because the first dimension may be more fine (e.g., seconds) than the second time dimension (e.g., minutes) the samples from the first time dimension can be grouped into intervals of the second time dimension. While the schema detection module 508 is shown as part of the duplicative data detection application 500, schema detection can be performed by an external system such as a named entity recognition (NER) system or service.

In another example, the named entity recognition process may recognize a state tier within a data source as a location and may also recognize a country tier within a data source as a location, where the country may be comprised of states. The named entity recognition can recognize relationships such as geography (e.g., area, city, county, state, and country), location (e.g., room, building floor, building, building group, campus, etc.), age (e.g., numeric age, age range grouping, e.g., 0-12, 13-18, 19-25, etc.), temperature (e.g., degrees, warm, hot, cold), etc. Thus, the named entity recognition may be able to programmatically analyze the schema of data sources to determine and learn hierarchical relationships (e.g., via a machine learning technique as discussed below in connection with FIG. 9) between various dimensions within the data sources. These learned hierarchies can be stored in the learned hierarchies library 514 to be reused as new data sources are encountered. The learned hierarchies from the learned hierarchies library 514 can be used as an initial (or "step 0") check on all new data sources to determine if duplicative data or a duplicative data storing intent is possibly present in the new data source with respect to an existing data source. For example, a relationship could include "the sum of bytes across all unique household IDs is equal to the bytes reported for an LCP." This relationship (e.g., LCP=sum(households)) can be stored as a learned hierarchy for future use and permits the system to use learned hierarchies or relationships and not have to re-learn them.

Once the duplicative data detection application 500 determines the schema of two or more data sources and determines any hierarchies, the duplicative data detection application 500 can proceed to perform data similarity operations on the data sources using data similarity identification logic 510. Determining data similarity can include using the categories returned from the named entity recognition for the two data sources being analyzed (categories provided by named entity recognition can provide additional context to dimensions, e.g., location, person, etc.) and iteratively aggregating over the dimensions of the first data source and the dimensions of the second data source and assessing the correlation between the aggregated dimensions of the first and second data sources. To improve the processing time and resources used for the correlation, the dimensions of the first data source and the second data source may be sampled along a time series (or other dimension) and the sampled data may be used for the aggregation and correlation.

For example, the data similarity identification logic 510 can include instructions for sampling a first metric based on a first time dimension of the first data source to obtain a plurality of values for the first metric that form a first time data series, and sampling a second metric based on a second time dimension of the second data source to generate a plurality of values for the second metric that form a second time data series.

The data similarity identification logic 510 can include instructions for generating a first two-dimensional aggregation of the first time data series having a time dimension and a dimension corresponding to aggregated values of the first metric, and generating a second two-dimensional aggregation of the second time data series having a time dimension and a dimension corresponding to aggregated values of the second metric. The data similarity identification logic 510 can include instructions for computing a correlation value between the first two-dimensional aggregation and the second two-dimensional aggregation.

In some implementations, the correlation value can be computed using a distance measure such as k-means clustering or correlation (or other suitable distance measuring technique) to determine a distance between the two two-dimensional aggregations. The correlation value can be based on the distance, for example, where a smaller distance indicates a higher correlation. Also, a confidence score can be determined based on the distance. For example, the smaller the distance, the higher the corresponding confidence score may be. In some implementations, candidate correlations can be taken from the correlations that meet a threshold and a precise aggregation can be performed on the dimensions in the candidate correlations using unsampled data (e.g., data not sampled across a time series). However, it will be appreciated that performing precise correlations may be more computationally intensive than performing correlation on sampled dimensions and may not be used or available in certain situations.

If the correlation value (e.g., from the sample correlation, or the unsampled correlation if available) meets a threshold, then the duplicative data detection application 500 can provide an indication (as discussed herein) of duplicated data between the first data source and the second data source (e.g., via the user interface 504 and/or the API 506). The threshold value can vary based on application, client specification, or other factors. For example, thresholds may be client specified (e.g. above 90%), application dependent, stringent (100%), and/or may change over time (e.g., as volume of data grows, budget for storage changes, number of data sources that cover a location increases, etc.). The duplicative data detection application 500 can include a data store interface 512. For example, the data store interface module can include interface logic for interfacing the duplicative data detection system with a cloud computing/storage system (e.g., 102, 202, 302, 402), a local data store (e.g., 214), or other data store, database, or any data storage device or system. The duplicative data detection application 500 may be a standalone system (e.g., 208 or 308) or part of a cloud computing/storage system (e.g., 108 or 408) or other system.

Figure 6A:
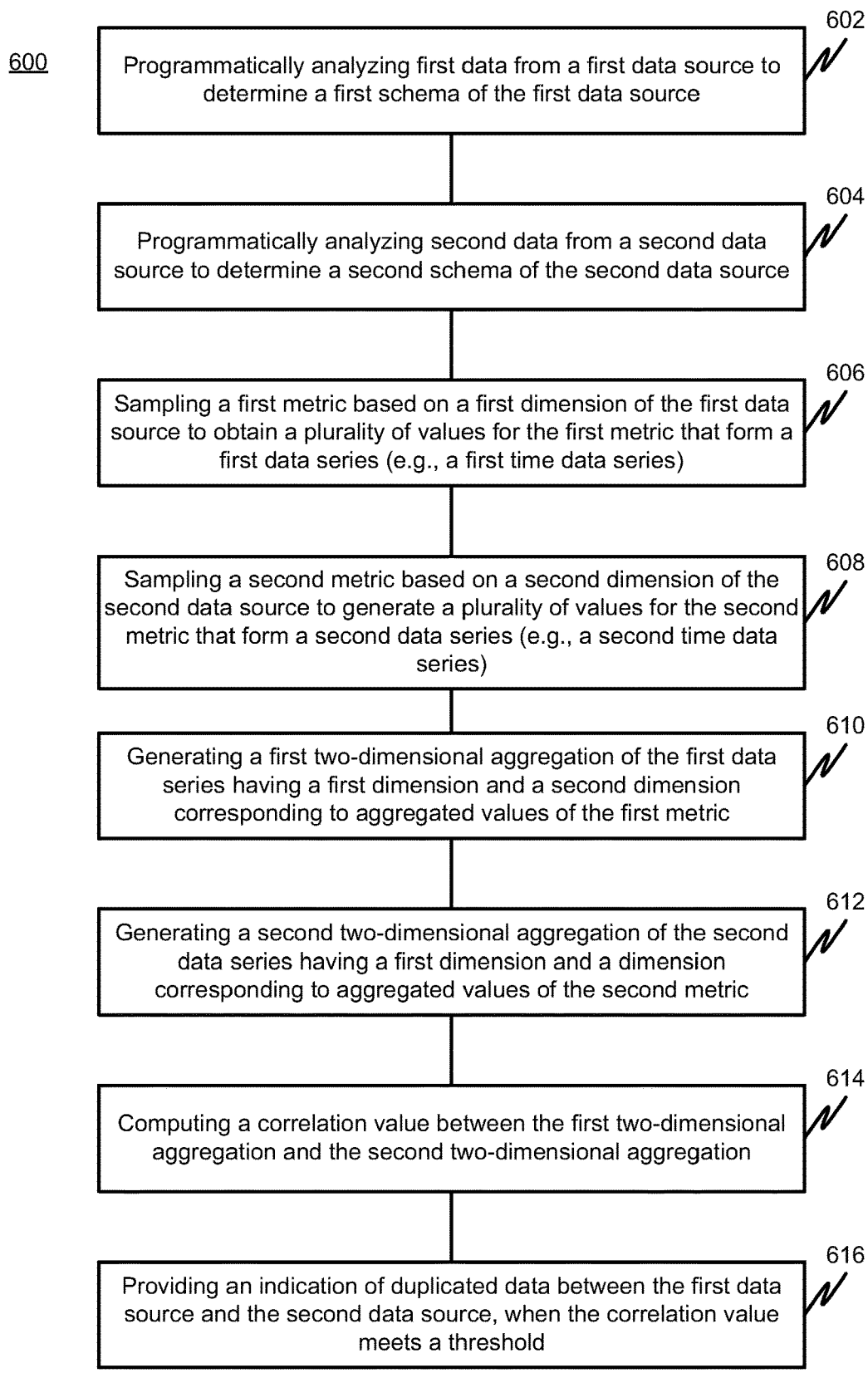
FIGS. 6A and 6B are flowcharts showing example duplicative data detection methods in accordance with some implementations.

FIG. 6A is a flowchart showing an example duplicative data detection method 600 in accordance with some implementations. Method 600 will be described in connection with an example use case of duplicative data detection in an Internet service provider (ISP) network as shown in FIG. 10.

Method 600 begins at 602, which includes programmatically analyzing first data from a first data source to determine a first schema of the first data source. The first schema can include one or more dimensions of the first data from the first data source. A schema can include the organization of a data source and identification of one or more dimensions (e.g., a categorical element of a data source that can be represented by structured labeling information and can be the "bucket" that is summarizing a metric) of the data source. Programmatically analyzing can include using one or more processors to analyze data from one or more data sources to determine a schema of the data, which can include using named entity recognition to determine the schema. Named entity recognition can be used to identify dimensions within a schema that may be similar or that provide different respective tiers, levels, or layers of granularity.

Figure 10:
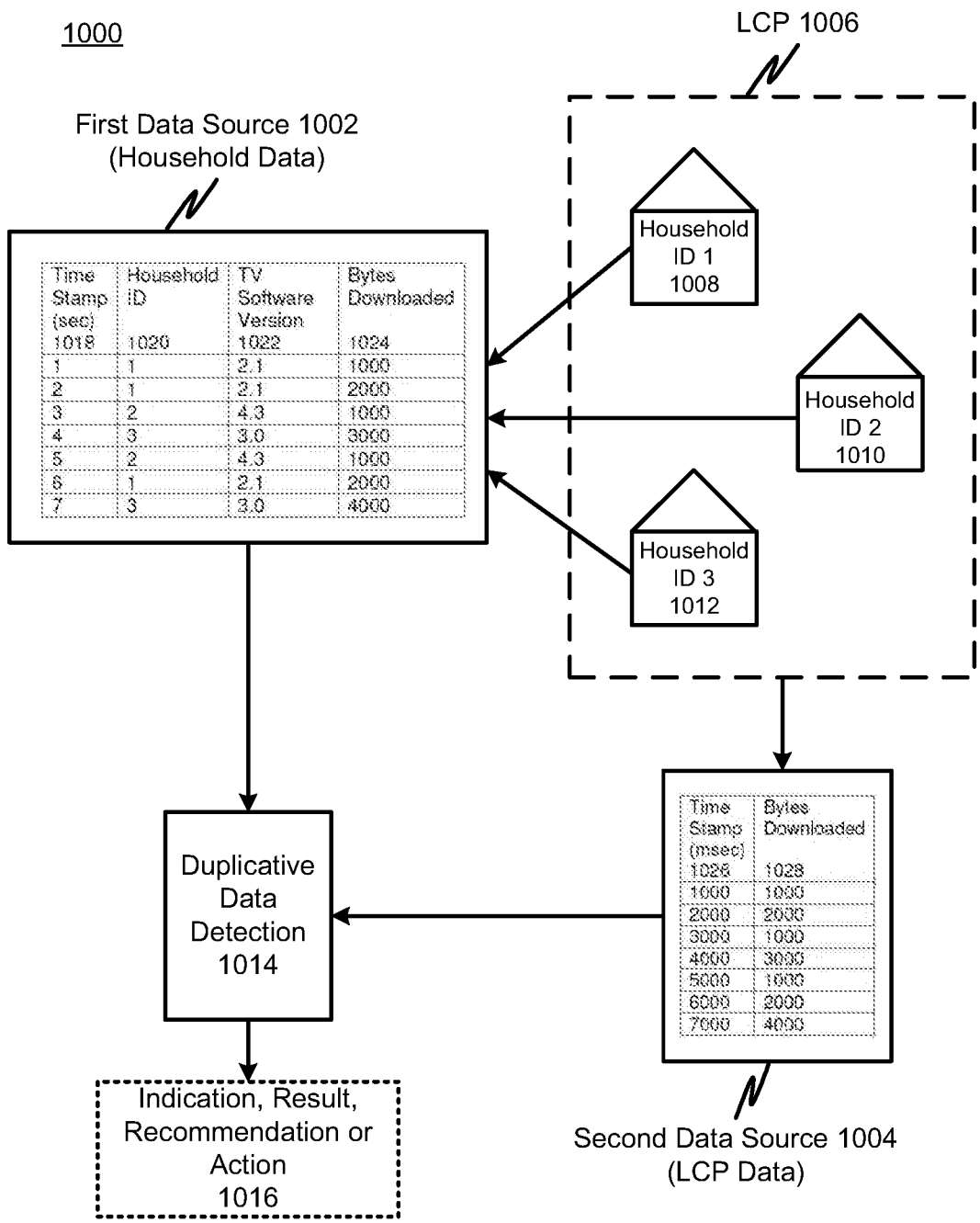
FIG. 10 is a diagram of an example environment of data sources and a duplicative data detection system in accordance with some implementations.

In the ISP example, as shown in FIG. 10, a first data source 1002 can include a first data log that logs how many bytes are downloaded per second per household. The ISP network includes a local convergence point 1006 (or LCP) that comprises a plurality of households 1008-1012. Data from households is stored int eh first data source 1002. Data for the LCP is stored in a second data source 1004. The first schema could include dimensions of time stamp 1018, household ID 1020, TV software version 1022, and bytes downloaded 1024. It will be appreciated that the example shown in FIG. 10 and described here is simplistic for purposes of illustration and explanation. Some implementations could include a duplicative data detection system that analyzes data sources having more or less dimensions and/or metrics and more or less data than that shown in FIG. 10. Processing continues to 604.

At 604, second data from a second data source is programmatically analyzed to determine a second schema of the second data source. The second schema can include one or more dimensions of the second data from the second data source. Programmatically analyzing can include using one or more processors to analyze data from one or more data sources to determine a schema of the data, which can include using named entity recognition to determine the schema. Named entity recognition can be used to identify dimensions within a schema that may be similar or that provide different respective tiers, levels, or layers of granularity.

Continuing with the ISP example, the second data source 1004 can include a source logging all bytes downloaded for the ISP network's local convergence point (or LCP) 1006 and the schema may include time stamp 1026, and bytes downloaded for LCP 1028. Processing continues to 606.

At 606, a first metric based on a first time dimension of the first data source is sampled to obtain a plurality of values for the first metric that form a first time data series.

For the ISP example, the bytes downloaded per household could be sampled by a duplicative data detection system 1014 by summing a sample of the bytes downloaded metric along the time dimension 1018 aggregated for all household IDs 1020. The initial sampling could be random with respect to the time dimension. Processing continues to 608.

At 608, a second metric based on a second time dimension of the second data source is sampled to generate a plurality of values for the second metric that form a second time data series.

For the ISP example, the bytes downloaded 1028 for the LCP could be sampled by the duplicative data detection system 1014 across a time dimension 1026. The initial sampling could be random with respect to the time dimension. Processing continues to 610.

At 610, a first two-dimensional aggregation of the first time data series having a time dimension and a dimension corresponding to aggregated values of the first metric is generated. For the ISP example, this could be the aggregate of household bytes downloaded over time. Processing continues to 612.

At 612, a second two-dimensional aggregation of the second time data series having a time dimension and a dimension corresponding to aggregated values of the second metric is generated. For the ISP example, this could be the LCP bytes downloaded over time. Processing continues to 614.

At 614, a correlation value between the first two-dimensional aggregation and the second two-dimensional aggregation is computed. The correlation can include using a clustering technique such as k-means clustering or other similar clustering or correlation technique to produce a representation of distance between two trend lines (e.g., the first and second two-dimensional aggregations). For the ISP example, because the household and LCP data were randomly sampled across time, the trend lines for the two samplings may not match precisely, but the duplicative data detection system 1014 may determine that the two trend lines match closely enough (e.g., after correlation using k-means clustering or other suitable technique) based on the distance between the two trend lines meeting a threshold value (e.g., being within a given distance, percentage, or other value of each other). Processing continues to 616.

At 616, if the correlation value meets a threshold, an indication of duplicated data between the first data source and the second data source is provided. In the ISP example, the duplicative data detection system could provide an indication 1016 (or result, action, or recommendation as discussed herein) that indicates LCP bytes downloaded (e.g., in the second data source 1004) is duplicative of the bytes per second per household data log (e.g., 1002), and that the bytes per second per household is a more granular data source. The indication 1016 can include a recommendation to retain the more granular data source (e.g., 1002) and discard the duplicative, less granular data source (e.g., the bytes downloaded dimension of the LCP data source).

The method 600 can optionally further include repeating the sampling and generating for the first data source and the second data source using respective other metrics different from the first metric and the second metric to generate respective additional pairs of two-dimensional aggregations corresponding to the first data source and the second data source, respectively. For example, the sampling and generating could be performed on other dimensions of the first and second data sources.

The method can include computing respective correlation values between each of the respective additional pairs of two-dimensional aggregations, and, if one or more of the respective correlation values meet the threshold, providing one or more additional indications of duplicated data between the first data source and the second data source. For example, returning to the ISP example, because the duplicative data detection system may not know, a priori, that the correct dimension to aggregate across is household ID, the repeating may be conducted for the various dimensions of the data sources (e.g., TV software version 1022, device type, etc.) to check for correlations between those dimensions and dimensions of the LCP data source. Some of the various dimensions for which the sampling, generating and correlating are performed may yield trend lines that have some degree of matching (e.g., are a certain distance apart), however there may be pairs of trend lines for which the distance between the two is within a threshold distance (e.g., the trend lines for aggregate household bytes downloaded and LCP bytes downloaded) such that the data represented by those trend lines is determined to be duplicative.

Aggregating across the household ID dimension, in this example, will yield the closest match because the LCP bytes downloaded is an aggregate of the household bytes downloaded. In other words, iterating over the various dimensions of the data sources will permit the duplicative data detection system to derive the relationship of "the sum of bytes across all unique household IDs is equal to the bytes reported for an LCP." This relationship (e.g., LCP=sum(households)) can be stored as a learned hierarchy for future use and permits the system to use learned hierarchies or relationships and not have to re-learn them. In some implementations, the sampling and generating could be performed using unsampled data (e.g., sampling could include sampling each value of a given metric), and correlated to generate an indication of a correlation of unsampled data could be used as a confirmation of the initial correlation determined from sampled data.

It will be appreciated that while method 600 describes using first and second time dimensions, other dimensions could be used such as location, device type, etc. In general any dimension suitable for use in the sampling and generating as described above could be used.

In addition to the steps mentioned above, method 600 can optionally further include identifying, using the named entity recognition technique (or other suitable technique), one or more of at least one dimension of the first schema of the first data source that is similar to at least one dimension of the second schema of the second data source, and at least one dimension of the first schema of the first data source and at least one dimension of the schema of the second data source that provide different levels of granularity of a common dimension.

In addition to the steps mentioned above, method 600 can optionally further include identifying one or more entity to entity relationships based on the first schema and the second schema, and storing the one or more entity to entity relationships in a library of relationships. The method can also include using the library of relationships to perform a duplication check for a third data source, for example when a new data source is added to a data store.

Figure 6B:
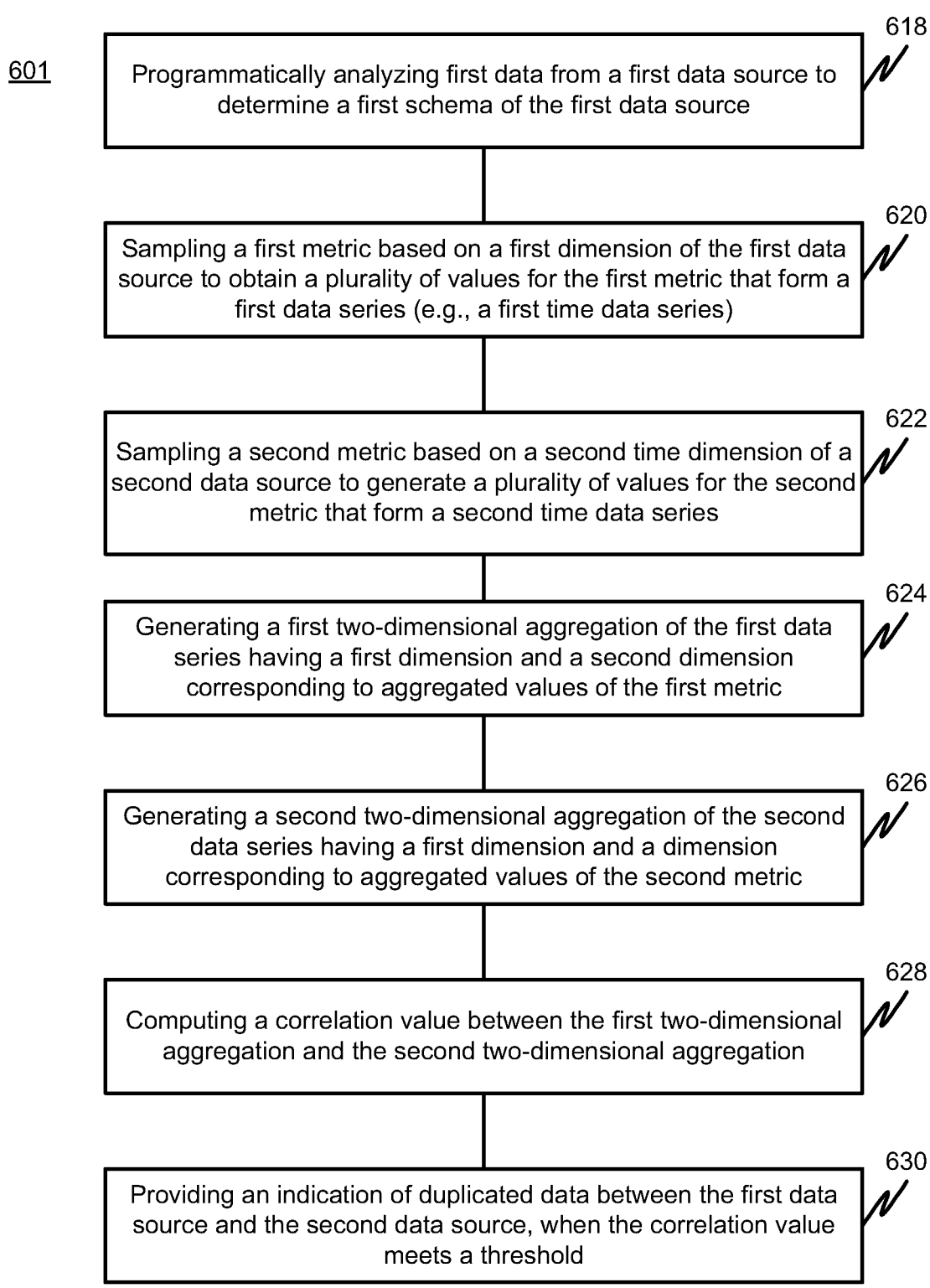

FIG. 6B is a flowchart showing an example duplicative data detection method 601 in accordance with some implementations. Method 601 begins at 618, which includes programmatically analyzing first data from a first data source to determine a first schema of the first data source. The first schema can include one or more dimensions of the first data from the first data source. A schema can include the organization of a data source and identification of one or more dimensions (e.g., a categorical element of a data source that can be represented by structured labeling information and can be the "bucket" that is summarizing a metric) of the data source. Programmatically analyzing can include using one or more processors to analyze data from one or more data sources to determine a schema of the data, which can include using named entity recognition to determine the schema. Named entity recognition can be used to identify dimensions within a schema that may be similar or that provide different respective tiers, levels, or layers of granularity. Processing continues to 620.

At 620, a first metric based on a first time dimension of the first data source is sampled to obtain a plurality of values for the first metric that form a first time data series.

At 622, a second metric based on a second time dimension of the second data source is sampled to generate a plurality of values for the second metric that form a second time data series. Processing continues to 610.

At 624, a first two-dimensional aggregation of the first time data series having a time dimension and a dimension corresponding to aggregated values of the first metric is generated. For the ISP example, this could be the aggregate of household bytes downloaded over time. Processing continues to 626.

At 626, a second two-dimensional aggregation of the second time data series having a time dimension and a dimension corresponding to aggregated values of the second metric is generated. For the ISP example, this could be the LCP bytes downloaded over time. Processing continues to 628.

At 628, a correlation value between the first two-dimensional aggregation and the second two-dimensional aggregation is computed. The correlation can include using a clustering technique such as k-means clustering or other similar clustering or correlation technique to produce a representation of distance between two trend lines (e.g., the first and second two-dimensional aggregations). Processing continues to 630.

At 30, if the correlation value meets a threshold, an indication of duplicated data between the first data source and the second data source is provided. The indication can include a recommendation to retain the more granular data source and discard the duplicative, less granular data source.

The method 601 can optionally further include repeating the sampling and generating for the first data source and the second data source using respective other metrics different from the first metric and the second metric to generate respective additional pairs of two-dimensional aggregations corresponding to the first data source and the second data source, respectively. For example, the sampling and generating could be performed on other dimensions of the first and second data sources.

The method can include computing respective correlation values between each of the respective additional pairs of two-dimensional aggregations, and, if one or more of the respective correlation values meet the threshold, providing one or more additional indications of duplicated data between the first data source and the second data source.

In some implementations, the sampling and generating could be performed using unsampled data (e.g., sampling could include sampling each value of a given metric), and correlated to generate an indication of a correlation of unsampled data could be used as a confirmation of the initial correlation determined from sampled data.

It will be appreciated that while method 601 describes using first and second time dimensions, other dimensions could be used such as location, device type, etc. In general any dimension suitable for use in the sampling and generating as described above could be used.

In addition to the steps mentioned above, method 601 can optionally further include identifying, using the named entity recognition technique (or other suitable technique), one or more of at least one dimension of the first schema of the first data source that is similar to at least one dimension of the second schema of the second data source, and at least one dimension of the first schema of the first data source and at least one dimension of the schema of the second data source that provide different levels of granularity of a common dimension.

In addition to the steps mentioned above, method 601 can optionally further include identifying one or more entity to entity relationships based on the first schema and the second schema, and storing the one or more entity to entity relationships in a library of relationships. The method can also include using the library of relationships to perform a duplication check for a third data source, for example when a new data source is added to a data store.

Figure 7:
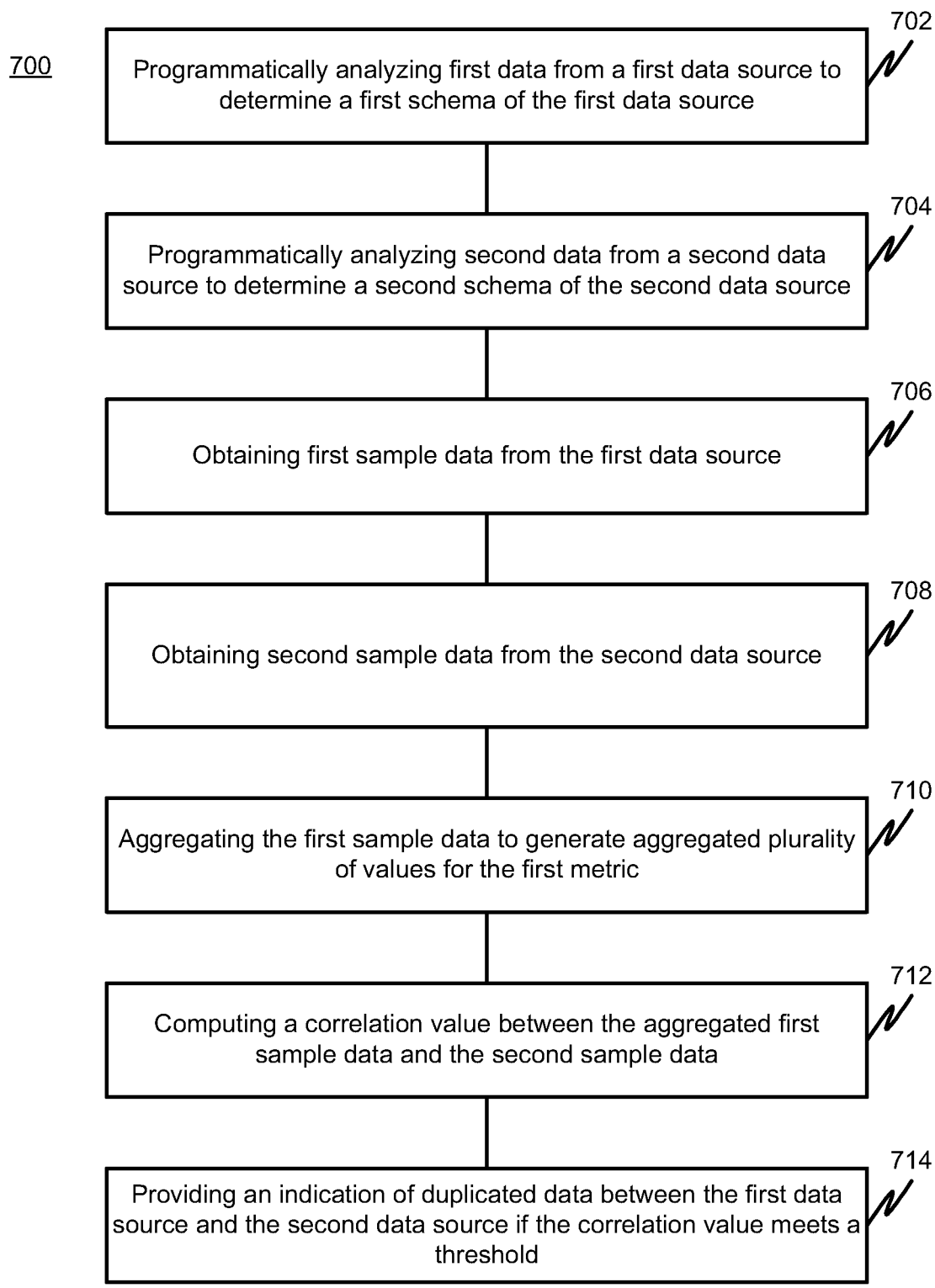
FIG. 7 is a flowchart showing an example duplicative data detection method in accordance with some implementations.

FIG. 7 is a flowchart showing an example duplicative data detection method 700 in accordance with some implementations. Method 700 begins at 702, which includes programmatically analyzing first data from a first data source to determine a first schema of the first data source. The first schema can include one or more dimensions of the first data from the first data source. Processing continues to 704.

At 704, second data from a second data source is programmatically analyzed to determine a second schema of the second data source. The second schema can include one or more dimensions of the second data from the second data source. Processing continues to 706.

At 706, first sample data is obtained from the first data source. The first sample data can include a plurality of values for a first metric and a respective first time value having a first time dimension. Processing continues to 708.

At 708, second sample data is obtained from the second data source. The second sample data can include a plurality of values for a first metric and a respective second time value having a second time dimension. In some implementations, the second time dimension can be less granular than the first time dimension. Processing continues to 710.

At 710, the first sample data is aggregated to generate aggregated plurality of values for the first metric. The aggregation can include grouping respective subsets of the plurality of values along a given dimension that are within a particular time interval. Processing continues to 712.

At 712, a correlation value between the aggregated first sample data and the second sample data is computed. The correlation value can be computed using k-means clustering or other suitable techniques. Processing continues to 714.

At 714, an indication of duplicated data between the first data source and the second data source is provided if the correlation value meets a threshold.

Figure 8:
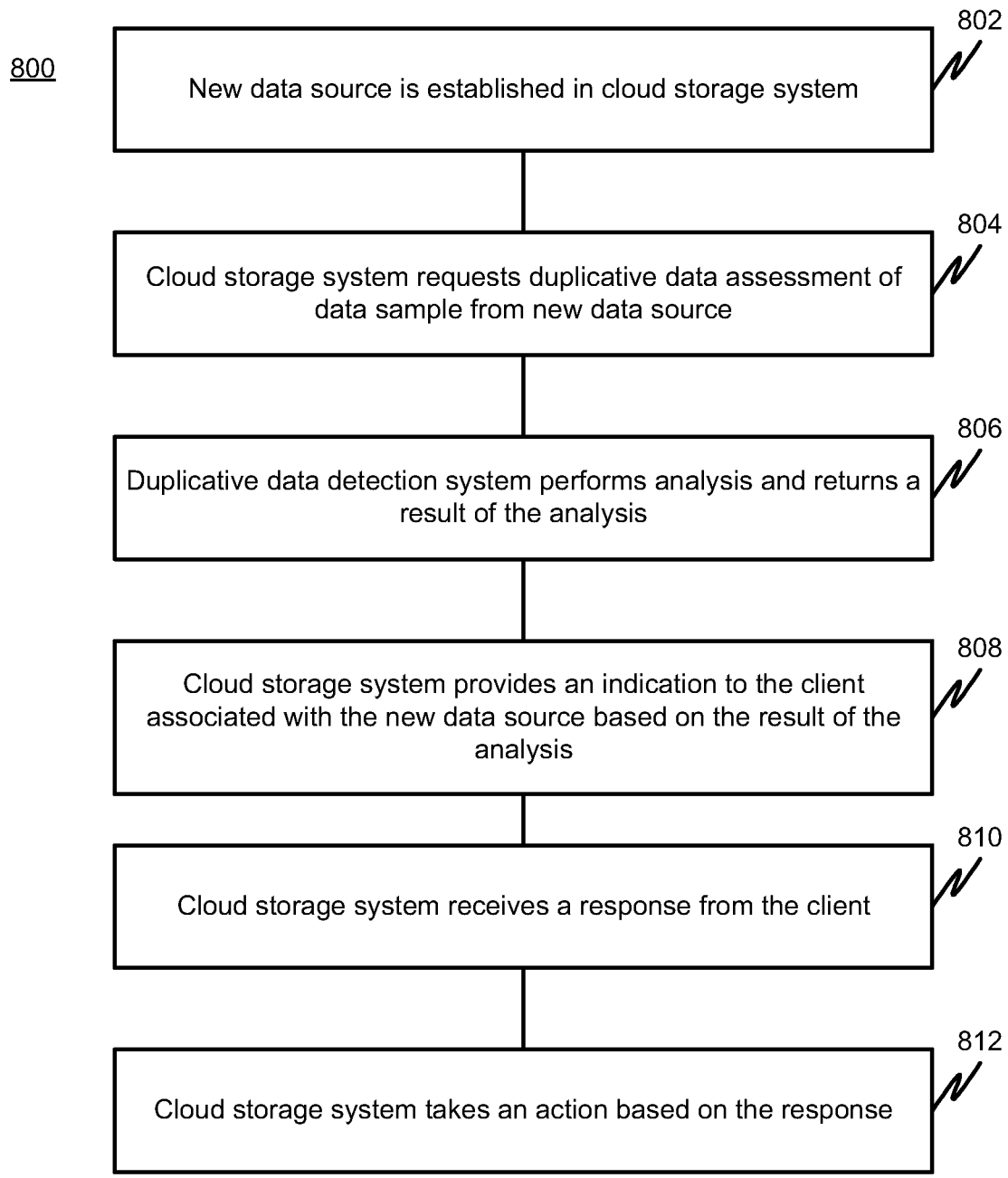
FIG. 8 is a flowchart showing an example duplicative data detection method in accordance with some implementations.

FIG. 8 is a flowchart showing an example duplicative data detection method 800 in accordance with some implementations. Method 800 begins at 802, where creation of a new data source is detected in a cloud storage system (or other storage system). The new data source could be automatically detected or could be detected based on a signal or message from the cloud storage system. Processing continues to 804.

At 804, upon the new data source being established, the cloud storage system requests duplicative data assessment of a data sample from the new data source. The request for duplicative data detection could be made directly to the duplicative data detection system or made via an API or other suitable interface. Processing continues to 806.

At 806, the duplicative data detection system performs an analysis (e.g., as described above) and returns a result to the cloud storage system. The result can include an indication of no data duplication, or some data duplication and, optionally, an indication of an extent of duplication. The indication can also include an identification of the existing data source(s) that are duplicative with the new data source. Processing continues to 808.

At 808, the cloud storage system provides an indication of duplicative data to a client associated with the new data source. The indication could be provided via a user interface, an API or the like. Processing continues to 810.

At 810, the cloud storage system receives a response from the client system. The response can include, for example, an indication to take no action, to discard duplicative data, etc. Processing continues to 812.

At 812, the cloud storage system takes an action based on the response received from the client system. For example, the cloud storage system may discard the data that is duplicative and less granular than other data present in the data store.

The duplicative data detection methods and systems described herein can be provided as an API for users of a cloud storage service. The duplicative data detection system could receive a request (e.g., via the API) for duplicative data detection from a user of the cloud storage system. In response, the duplicative data detection system could perform duplicative data detection (e.g., one or more of methods 600, 700, and 800). Based on the duplicative data detection results, the system could provide an indication of duplicative data (if any) and a recommendation for reducing duplicative data and optionally an indication of bandwidth savings, cost savings, storage savings, etc. The underlying cloud storage system could, upon receiving an indication from the user to do so, automatically perform de-duplication and, with permission of the user, not store similar duplicative data in the future.

In another example, a user may be storing certain data in a data store and performing operations on that data. The operations utilize certain dimensions of the data. An implementation of the duplicative data detection system could determine which portions of customer data to store based on the operations being performed by correlating the dimensions or results of the operations with the incoming data being stored.

In another example, a duplicative data detection system could determine that two devices are storing duplicative data. As a response to the determination, the system could communicate to one of the devices to stop the one device from storing the duplicative data. Such an implementation could reduce data communications, processing and storage costs.

In yet another example, a duplicative data detection system could be used to detect duplicative data for long term data stores. The duplicative data detection could be applied to data marked for storage in a long term data store to help reduce duplicative data being sent to long term storage. Also, duplicative data detection could be performed on data already in long term storage to help reduce the size of the long term storage by eliminating duplicative data from the long term storage.

Figure 9:
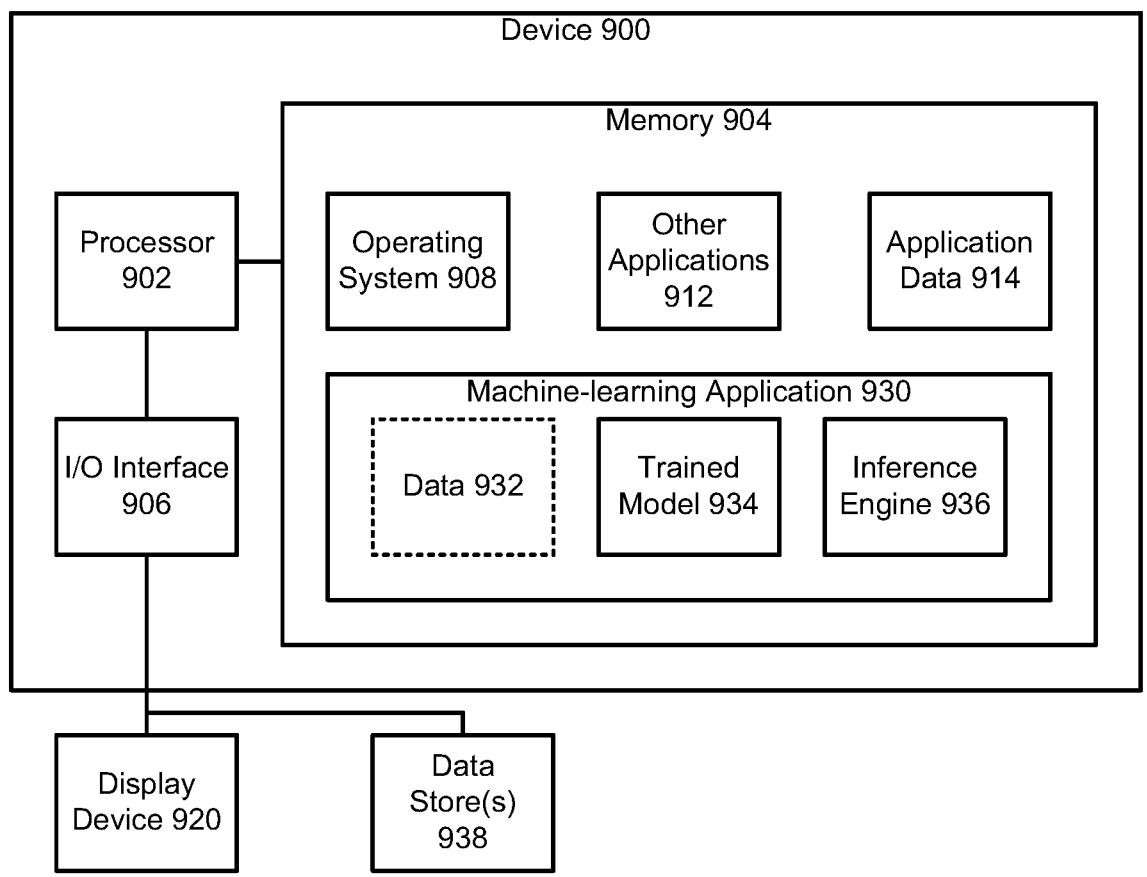
FIG. 9 is a block diagram of an example device which may be used for one or more implementations described herein.

FIG. 9 is a block diagram of an example device 900 which may be used to implement one or more features described herein. In one example, device 900 may be used to implement a client device, e.g., any of client devices 120-126 shown in FIG. 1. Alternatively, device 900 can implement a server device, e.g., server device 104, and/or a duplicative data detection device (e.g., 208), etc. In some implementations, device 900 may be used to implement a client device, a server device, a duplicative data detection device, or a combination of the above. Device 900 can be any suitable computer system, server, or other electronic or hardware device as described above.

One or more methods described herein (e.g., 600, 700, and/or 800) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, and I/O interface 906. Processor 902 can be one or more processors and/or processing circuits to execute program code and control basic operations of the device 900. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 902 may include one or more co-processors that implement neural-network processing. In some implementations, processor 902 may be a processor that processes data to produce probabilistic output, e.g., the output produced by processor 902 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, machine-learning application 930, other applications 912, and application data 914. Other applications 912 may include applications such as a data display engine, web hosting engine, image display engine, notification engine, social networking engine, etc. In some implementations, the machine-learning application 930 and other applications 912 can each include instructions that enable processor 902 to perform functions described herein, e.g., some or all of the methods of FIGS. 6, 7, and 8.

The machine-learning application 930 can include one or more NER implementations for which supervised and/or unsupervised learning can be used. The machine learning models can include multi-task learning based models, residual task bidirectional LSTM (long short-term memory) with conditional random fields, statistical NER, etc. Other applications 912 can include, e.g., duplicative data detection, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 930 may utilize Bayesian classifiers, support vector machines, neural networks, or other learning techniques. In some implementations, machine-learning application 930 may include a trained model 934, an inference engine 936, and data 932. In some implementations, data 932 may include training data, e.g., data used to generate trained model 934. For example, training data may include any type of data suitable for training a model for named entity recognition and/or learned hierarchies, such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 934, training data may include such user data. In implementations where users permit use of their respective user data, data 932 may include permitted data.

In some implementations, data 932 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 930 excludes data 932. For example, in these implementations, the trained model 934 may be generated, e.g., on a different device, and be provided as part of machine-learning application 930. In various implementations, the trained model 934 may be provided as a data file that includes a model structure or form, and associated weights. Inference engine 936 may read the data file for trained model 934 and implement a neural network with node connectivity, layers, and weights based on the model structure or form specified in trained model 934.

Machine-learning application 930 also includes a trained model 934. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 932 or application data 914. Such data can include, for example, dimensions of a data source, e.g., when the trained model is used for named entity recognition of data sources. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, trained model 934 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 934 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 932, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to identify schemas and dimensions of data sources, and/or to learn hierarchies of dimensions of different data sources.

In another example, a model trained using unsupervised learning may cluster words based on the use of the words in data sources. In some implementations, unsupervised learning may be used to produce knowledge representations, e.g., that may be used by machine-learning application 930. In various implementations, a trained model includes a set of weights, or embeddings, corresponding to the model structure. In implementations where data 932 is omitted, machine-learning application 930 may include trained model 934 that is based on prior training, e.g., by a developer of the machine-learning application 930, by a third-party, etc. In some implementations, trained model 934 may include a set of weights that are fixed, e.g., downloaded from a server that provides the weights.

Machine-learning application 930 also includes an inference engine 936. Inference engine 936 is configured to apply the trained model 934 to data, such as application data 914, to provide an inference. In some implementations, inference engine 936 may include software code to be executed by processor 902. In some implementations, inference engine 936 may specify circuit configuration (e.g., for a programmable processor, for a field programmable gate array (FPGA), etc.) enabling processor 902 to apply the trained model. In some implementations, inference engine 936 may include software instructions, hardware instructions, or a combination. In some implementations, inference engine 936 may offer an application programming interface (API) that can be used by operating system 908 and/or other applications 912 to invoke inference engine 936, e.g., to apply trained model 934 to application data 914 to generate an inference.

Machine-learning application 930 may provide several technical advantages. For example, when trained model 934 is generated based on unsupervised learning, trained model 934 can be applied by inference engine 936 to produce knowledge representations (e.g., numeric representations) from input data, e.g., application data 914. For example, a model trained for named entity recognition may produce representations of dimensions of a data source, or a model trained for learning data source dimension hierarchies may produce representations of such hierarchies. In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 936.

In some implementations, knowledge representations generated by machine-learning application 930 may be provided to a different device that conducts further processing, e.g., over a network. In such implementations, providing the knowledge representations rather than the images may provide a technical benefit, e.g., enable faster data transmission with reduced cost. In another example, a model trained for analyzing data sources to identify schemas and dimensions may produce a schema and one or more dimensions for a given data source. The document clusters may be suitable for further processing (e.g., determining whether a document is related to a topic, determining a classification category for the document, etc.) without the need to access the original document, and therefore, save computational cost.

In some implementations, machine-learning application 930 may be implemented in an offline manner. In these implementations, trained model 934 may be generated in a first stage, and provided as part of machine-learning application 930. In some implementations, machine-learning application 930 may be implemented in an online manner. For example, in such implementations, an application that invokes machine-learning application 930 (e.g., operating system 908, one or more of other applications 912) may utilize an inference produced by machine-learning application 930, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 934, e.g., to update embeddings for trained model 934.

In some implementations, machine-learning application 930 may be implemented in a manner that can adapt to particular configuration of device 900 on which the machine-learning application 930 is executed. For example, machine-learning application 930 may determine a computational graph that utilizes available computational resources, e.g., processor 902. For example, if machine-learning application 930 is implemented as a distributed application on multiple devices, machine-learning application 930 may determine computations to be carried out on individual devices in a manner that optimizes computation. In another example, machine-learning application 930 may determine that processor 902 includes a GPU with a particular number of GPU cores (e.g., 1000) and implement the inference engine accordingly (e.g., as 1000 individual processes or threads).

In some implementations, machine-learning application 930 may implement an ensemble of trained models. For example, trained model 934 may include a plurality of trained models that are each applicable to same input data. In these implementations, machine-learning application 930 may choose a particular trained model, e.g., based on available computational resources, success rate with prior inferences, etc. In some implementations, machine-learning application 930 may execute inference engine 936 such that a plurality of trained models is applied. In these implementations, machine-learning application 930 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 908 or one or more other applications 912.

In different implementations, machine-learning application 930 can produce different types of outputs. For example, machine-learning application 930 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 930 may produce an output video with a particular effect applied, e.g., rendered in a comic-book or particular artist's style, when trained model 934 is trained using training data from the comic book or particular artist, etc. In some implementations, machine-learning application 930 may produce an output based on a format specified by an invoking application, e.g. operating system 908 or one or more other applications 912. In some implementations, an invoking application may be another machine-learning application. For example, such configurations may be used in generative adversarial networks, where an invoking machine-learning application is trained using output from machine-learning application 930 and vice-versa.

Any of software in memory 904 can alternatively be stored on any other suitable storage location or computer-readable medium. In addition, memory 904 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. Interfaced devices can be included as part of the device 900 or can be separate and communicate with the device 900. For example, network communication devices, storage devices (e.g., memory and/or data store 106), and input/output devices can communicate via I/O interface 906. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 906 can include one or more display devices 920 and one or more data stores 938 (as discussed above). The display devices 920 that can be used to display content, e.g., a user interface of an output application as described herein. Display device 920 can be connected to device 900 via local connections (e.g., display bus) and/or via networked connections and can be any suitable display device. Display device 920 can include any suitable display device such as an LCD, LED, or plasma display screen, CRT, television, monitor, touchscreen, 3-D display screen, or other visual display device. For example, display device 920 can be a flat display screen provided on a mobile device, multiple display screens provided in a goggles or headset device, or a monitor screen for a computer device.

The I/O interface 906 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 9 shows one block for each of processor 902, memory 904, I/O interface 906, and software blocks 908, 912, and 930. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While some components are described as performing blocks and operations as described in some implementations herein, any suitable component or combination of components of environment 100, device 900, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   programmatically analyzing first data from a first data source to determine a first schema of the first data source, the first schema including one or more dimensions of the first data from the first data source, at least one of the one or more dimensions of the first data from the first data source being a first time dimension;
   programmatically analyzing second data from a second data source to determine a second schema of the second data source, the second schema including one or more dimensions of the second data from the second data source, at least one of the one or more dimensions of the second data of the second data source being a second time dimension;
   sampling a first metric based on a first time dimension of the first data source to obtain a plurality of values for the first metric that form a first time data series, wherein the plurality of values for the first metric are sampled based on the first time dimension;
   sampling a second metric based on a-the second time dimension of the second data source to obtain a plurality of values for the second metric that form a second time data series, wherein the plurality of values for the second metric are sampled based on the second time dimension;
   generating a first two-dimensional aggregation of the first time data series having a time dimension and a dimension corresponding to aggregated values of the first metric;
   generating a second two-dimensional aggregation of the second time data series having a time dimension and a dimension corresponding to aggregated values of the second metric;
   computing a correlation value between the first two-dimensional aggregation and the second two-dimensional aggregation; and
   when the correlation value meets a threshold, providing an indication of duplicated data between the first data source and the second data source.

2. The computer-implemented method of claim 1, wherein programmatically analyzing the first data source to determine the first schema of the first data source is performed using a named entity recognition technique.

3. The computer-implemented method of claim 2, further comprising identifying, using the named entity recognition technique, one or more of:
- at least one dimension of the first schema of the first data source that is similar to at least one dimension of the second schema of the second data source, and
- at least one dimension of the first schema of the first data source and at least one dimension of the second schema of the second data source that provide different levels of granularity of a common dimension.

4. The computer-implemented method of claim 1, wherein computing the correlation value is performed using k-means clustering.

5. The computer-implemented method of claim 1, further comprising:
- repeating the sampling and generating for the first data source and the second data source using respective other metrics different from the first metric and the second metric to generate respective additional pairs of two-dimensional aggregations corresponding to the first data source and the second data source, respectively;
- computing respective correlation values between each of the respective additional pairs of two-dimensional aggregations; and
- when one or more of the respective correlation values meet the threshold, providing one or more additional indications of the duplicated data between the first data source and the second data source.

6. The computer-implemented method of claim 1,
- wherein sampling the first metric based on the first time dimension of the first data source includes sampling each value of the first metric; and
- wherein sampling the second metric based on the second time dimension of the second data source includes sampling each value of the second metric.

7. The computer-implemented method of claim 1, wherein providing the indication of the duplicated data includes providing a recommendation of a level of granularity of data to store.

8. The computer-implemented method of claim 1, further comprising:
- identifying one or more entity to entity relationships based on the first schema and the second schema;
- storing the one or more entity to entity relationships in a library of relationships; and
- using the library of relationships to perform a duplication check for a third data source wherein the duplication check for the third data source comprises a check for duplicated data between the third data source and the first data source or the third data source and the second data source.

9. The computer-implemented method of claim 1, wherein providing the indication of the duplicated data includes providing a user interface that includes a user interface element that, when selected, causes the duplicated data to be deleted from at least one of the first data source and the second data source.

10. The computer-implemented method of claim 9, further comprising:
- upon selection of the user interface element, deleting the duplicated data from the at least one of the first data source and the second data source, wherein the deletion causes storage space utilized for storage of the first data to be lower than prior to the deletion.

11. The computer-implemented method of claim 1, wherein providing the indication of the duplicated data between the first data source and the second data source comprises:
- automatically deleting the duplicated data; and
- providing a user interface that indicates that the duplicated data was deleted.

12. The computer-implemented method of claim 11, wherein the user interface includes an element that indicates an amount of the duplicated data.

13. The computer-implemented method of claim 1, wherein providing the indication of the duplicated data between the first data source and the second data source comprises providing a confidence value for the duplicated data.

14. A non-transitory computer-readable medium storing instructions, the instructions when executed by one or more processors, cause the one or more processors to:
- programmatically analyze first data from a first data source to determine a first schema of the first data source, the first schema including one or more dimensions of the first data from the first data source, the first data of the first data source further comprising a first time dimension;
- programmatically analyze second data from a second data source to determine a second schema of the second data source, the second schema including one or more dimensions of the second data from the second data source, the second data of the second data source further comprising a second time dimension;
- obtain first sample data from the first data source wherein the first sample data includes a plurality of values for a first metric and a respective first time value having a first time dimension;
- obtain second sample data from the second data source wherein the second sample data includes a plurality of values for the first metric and a respective second time value having a second time dimension, wherein the second time dimension is less granular than the first time dimension;
- aggregate the first sample data to generate aggregated first sample data comprising a plurality of values for the first metric, wherein the aggregated first sample data includes grouping respective subsets of the plurality of values that are within a respective particular time interval;
- calculate a correlation value between the aggregated first sample data and the second sample data; and
- when the correlation value meets a threshold, provide an indication of duplicated data between the first data source and the second data source.

15. The computer-readable medium of claim 14, wherein the particular time interval corresponds to granularity of the second time dimension.

16. The computer-readable medium of claim 14, wherein the first time dimension is seconds, the second time dimension is minutes, and wherein the particular time interval is one minute.

17. A system comprising:
- one or more processors coupled to a non-transitory computer readable medium having stored thereon software instructions that, when executed by the one or more processors, cause the one or more processors to perform operations including:
  - programmatically analyzing first data from a first data source to determine a first schema of the first data source, the first schema including one or more dimensions of the first data from the first data source, the first data of the first data source further comprising a first time dimension;
sampling a first metric based on a first time dimension of the first data source to obtain a plurality of values for the first metric that form a first time data series, the plurality of values for the first metric are sampled based on the first time dimension;
sampling a second metric based on a second time dimension of a second data source to obtain a plurality of values for the second metric that form a second time data series, wherein the second data source has a second schema that includes one or more dimensions, the second data of the second data source further comprising a second time dimension, and the plurality of values for the second metric are sampled based on the second time dimension;
generating a first two-dimensional aggregation of the first time data series having a time dimension and a dimension corresponding to aggregated values of the first metric;
generating a second two-dimensional aggregation of the second time data series having a time dimension and a dimension corresponding to aggregated values of the second metric;
computing a correlation value between the first two-dimensional aggregation and the second two-dimensional aggregation; and
when the correlation value meets a threshold, providing an indication of duplicated data between the first data source and the second data source.

18. The system of claim 17, wherein programmatically analyzing the first data source to determine the first schema of the first data source is performed using a Named Entity Recognition (NER) technique.

19. The system of claim 17, wherein the non-transitory computer readable medium has further software instructions stored thereon that, when executed by the one or more processors, cause the one or more processors to perform further operations including:
repeating the sampling and generating for the first data source and the second data source using respective other metrics different from the first metric and the second metric to generate respective additional pairs of two-dimensional aggregations corresponding to the first data source and the second data source, respectively;
computing respective correlation values between each of the respective additional pairs of two-dimensional aggregations; and
when one or more of the respective correlation values meet the threshold, providing one or more additional indications of the duplicated data between the first data source and the second data source.

20. The system of claim 17, wherein providing the indication of the duplicated data includes providing a user interface that includes a user interface element that, when selected, causes the duplicated data to be deleted from at least one of the first data source and the second data source, and wherein the operations further include, upon selection of the user interface element, deleting the duplicated data from the at least one of the first data source and the second data source, wherein storage space utilized for storage of the first data and the second data is reduced after the deleting.

* * * * *